(12) United States Patent
Bregger et al.

(10) Patent No.: US 11,876,775 B2
(45) Date of Patent: Jan. 16, 2024

(54) SYSTEM AND METHOD FOR MONITORING COMMUNICATION TRAFFIC ASSOCIATED WITH DYNAMIC INTERNET SERVICES VIA DNS MONITORING

(71) Applicant: Arbor Networks, Inc., Westford, MA (US)

(72) Inventors: Matthew Bregger, Saline, MI (US); Andrew Lee Adams, Ann Arbor, MI (US)

(73) Assignee: ARBOR NETWORKS, INC., Westford, MA (US)

( * ) Notice: Subject to any disclaimer, the term of this patent is extended or adjusted under 35 U.S.C. 154(b) by 0 days.

(21) Appl. No.: 17/897,947

(22) Filed: Aug. 29, 2022

(65) Prior Publication Data

US 2023/0060730 A1    Mar. 2, 2023

Related U.S. Application Data

(60) Provisional application No. 63/238,433, filed on Aug. 30, 2021.

(51) Int. Cl.
*G06F 13/00* (2006.01)
*H04L 61/5007* (2022.01)
*H04L 61/4511* (2022.01)

(52) U.S. Cl.
CPC ...... *H04L 61/5007* (2022.05); *H04L 61/4511* (2022.05)

(58) Field of Classification Search
None
See application file for complete search history.

(56) References Cited

U.S. PATENT DOCUMENTS

| | | | |
|---|---|---|---|
| 10,644,938 B1 * | 5/2020 | Petit-Huguenin | H04L 67/01 |
| 2002/0059622 A1 * | 5/2002 | Grove | H04L 61/4511 725/91 |
| 2006/0140182 A1 * | 6/2006 | Sullivan | H04L 67/306 370/395.3 |
| 2015/0138985 A1 * | 5/2015 | Higgins | H04W 28/0247 370/237 |
| 2015/0180831 A1 * | 6/2015 | Bowers | H04L 63/0236 726/1 |
| 2018/0337941 A1 * | 11/2018 | Kraning | H04L 43/10 |
| 2019/0253385 A1 * | 8/2019 | Gurney | H04L 63/101 |
| 2022/0376887 A1 * | 11/2022 | Wright | H04L 9/008 |

* cited by examiner

*Primary Examiner* — Christopher B Robinson
(74) *Attorney, Agent, or Firm* — Foley & Lardner LLP

(57) ABSTRACT

Matching an internet service with an IP host address to attribute network traffic to the internet service by mapping one or more server names to an internet service by a network device by detecting a DNS Response to a DNS Query. Inspect the DNS Response to determine an association of a service consumer's IP address with an internet service's server IP address relating to a certain internet service to maintain an array of indexed entries having an association of the service consumer's IP address with an internet service's server IP address relating to a certain internet service for a certain length of time using a probabilistic data structure for the indexed entries.

20 Claims, 2 Drawing Sheets

SYSTEM AND METHOD FOR MONITORING COMMUNICATION TRAFFIC ASSOCIATED WITH DYNAMIC INTERNET SERVICES VIA DNS MONITORING

CROSS REFERENCE TO RELATED APPLICATIONS

This application claims priority to U.S. Patent Application Ser. No. 63/238,433 filed Aug. 30, 2021 which is incorporated herein by reference in its entirety.

FIELD OF THE INVENTION

The disclosed embodiments generally relate to monitoring network traffic in a communication network, and more particularly, determining network traffic associated with certain internet service providers in a communication network.

BACKGROUND OF THE INVENTION

The internet is a global network of individual computers and the Domain Name System (DNS) is integral and vital to its operation. In this global network, each individual computer is assigned a unique identifying number called an Internet Protocol address or IP address. Information flows between computers on the internet by being bundled into individual messages referred to as packets. In order for one computer to send a packet to another, it places the receiver's IP address in the packet. At the lower levels of packet delivery, IP addresses are how computers recognize one another and permit intermediate network devices such as routers to deliver packets from one computer to another.

Typically, computer users do not know the IP address of a remote computer to which they want to send information. IP addresses are difficult for humans to remember and so human-language names are given to computers instead, following a naming convention dictated by DNS; e.g. www.netflix.com. DNS provides functionality that maps human-language names to IP addresses so that information can be sent from one computer to another.

The Domain Name System works by having computers known as DNS servers that, in the simplest case, store a look-up table that maps a computer's human-language name to its IP address. In a common scenario, a user types into the internet browser resident on their personal computer a particular web site of interest in the form of a Uniform Resource Locator (URL; e.g. http://www.netflix.com). The browser causes the computer on which it is running to send what is known as a DNS Query message. This message contains the name "www.netflix.com" and the message is delivered to a DNS server, typically one owned and/or operated by their Internet Service Provider (ISP). The DNS server searches its look-up table for www.netflix.com and if that name is found, then it sends a DNS Reply message containing, among other things, the IP address corresponding to that name and the length of time (TTL) for which the mapping is valid. The DNS Reply is delivered back to the user's computer and the IP address contained in the reply is thereafter used to communicate with the computer named www.netflix.com. It is to be appreciated that an internet service (e.g., Netflix) often uses various servers each having a different server IP address, with such server IP addresses not having an identifier indicating the service it is providing. For instance, the internet service Netflix may use an IP address associated with East Coast servers (and not Netflix) whereby the servers provided by East Coast servers hosting Netflix services may also be hosting other internet services such as Hulu. Thus, it is then difficult for an Internet Service Provider (ISP) (e.g., Verizon) that provides Internet access to users, including companies, families, and mobile users, to determine the traffic bandwidth consumption attributable to a certain internet service (e.g., Netflix). It is to be appreciated that it is desirable for an ISP to be able to readily determine certain internet services (e.g., Netflix) consuming traffic bandwidth on its network. Accordingly, it is an objective of the illustrated embodiments described herein to provide a system and method for matching an internet service with an IP host address to attribute network traffic to the internet service.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for matching an internet service with an IP host address to attribute network traffic to the internet service (SERVICE_NAME) by mapping one or more server names to an internet service by a network device is described, in which internet network traffic is monitored in a communication network by the network device so as to detect a Domain Name System (DNS) Response to a DNS Query in the monitored internet network traffic. The DNS Response is inspected to determine an association of a service consumer's IP address with an internet service's server IP address in the detected DNS Response relating to a certain internet service so as to maintain in an array of indexed entries (SERVICE_TABLE), an association of the service consumer's IP address with an internet service's server IP address relating to a certain internet service for a certain length of time using a probabilistic data structure for the indexed entries. The certain length of time is extended upon continuing association of the service consumer's IP address with the internet service's server IP address in the monitored internet traffic relating to the certain internet service. The association of the service consumer's IP address with an internet service's server IP address relating to a certain internet service is expired upon expiration of the certain length of time.

BRIEF DESCRIPTION OF THE DRAWINGS

The accompanying appendices and/or drawings illustrate various non-ml tint, example, inventive aspects in accordance with the present disclosure.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims. The present embodiments relate to a method, apparatus and system configured to monitor internet network traffic in a communication network for matching an internet service with an IP host address to attribute network traffic to the internet service.

Figure 1:
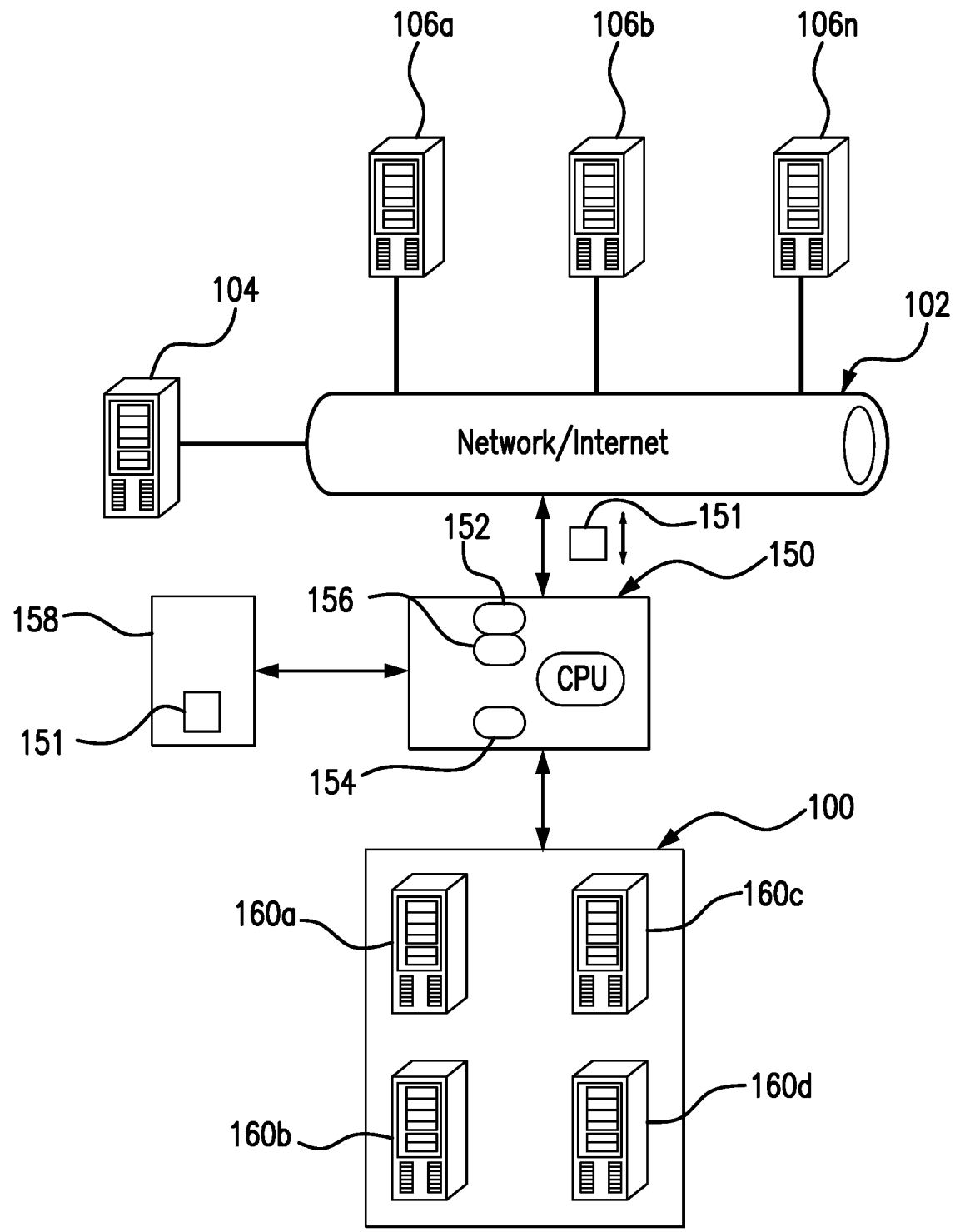
FIG. 1 illustrates an exemplary network communications system, in which an embodiment of the present invention may be implemented.

Turning now descriptively to the drawings, in which similar reference characters denote similar elements throughout the several views, FIG. 1 illustrates a generalized monitoring system for matching an internet service with an IP host address to attribute network traffic to the internet service (SERVICE_NAME) by mapping one or more server names to an internet service by a network device.

The exemplary embodiment of FIG. 1 depicts the relationship between a network of user's computing devices 100, a network monitoring system 150, Internet 102, external host devices 106a-106n, and one or more DNS servers 104. The external host devices 106a-106n each preferably host one or more internet services (e.g., Netflix, Hulu, etc.). It is to be understood that network 100 preferably includes a plurality of user computing devices 160a-160d, each preferably having a unique IP address. It is to be appreciated that in accordance with an illustrated embodiment, the monitoring system 150 is configured and operable to match an internet service with an IP host address to attribute network traffic to a certain internet service by mapping one or more server names to an internet service for a certain period of time that the IP host address is expected to be providing a certain internet service.

It is to be appreciated that the illustrated embodiment of FIG. 1 is provided for ease of discussion purposes only for depicting a generalized exemplary environment of the subject illustrated embodiments. As such, it is to be understood the illustrated embodiment of FIG. 1 is not to be understood to be limiting, as other systems capable of carrying out the process for mapping one or more server names to an internet service for a certain period of time that the IP host address is expected to be providing a certain internet service may be utilized.

In a typical implementation, the external host devices 106a-106n (also referred to as external devices or host devices) each preferably host one or more internet services (e.g., Netflix, Hulu, etc.) for certain periods of time. For instance, host device 106a may host Netflix services for a certain amount of time, and at other times may not. The host devices 106a-106n connect to service consumer devices 160a-160d within a network 100 typically via a private network or a public computer network such as the Internet 102. Examples of service consumer devices include servers, laptops, desktop computers, tablet devices, mobile phones, mobile computing devices, video games systems, televisions and other similar devices and systems having Internet connectivity.

In a preferred embodiment, network traffic from the communication network 102 to the network of devices 100 is monitored by a network monitor device 150, such as the Sightline™ system commercially available from NetScout Systems, Inc. The network monitor device 150 is preferably located between the Internet 102 and the network of consumer devices 100. In other embodiments, the network monitor device 150 may be located within the Internet, service provider network or enterprise network rather than as a network edge as illustrated.

The network monitor device 150 preferably includes a packet processing system preferably having an external high speed network interface 152. Typically, these interfaces are capable of handling 1-100 Gbps, for example. Device 150 may further include processing modules, such as traffic analyzer 156 that preferably process the packets received at interface 152. Additionally, a central processing unit (CPU), random access memory (RAM), and one or more storage mediums 158 are preferably connected through buses and are used to further support mapping/associating one or more server names (106a-106n) to an internet service for a certain period of time that the IP host address (e.g., 106a) is expected to be providing a certain internet service (e.g., Netflix) to a certain service consumer's IP address (160a) in accordance with the illustrated embodiments.

Computer code is preferably stored in storage medium and executed by the CPU of the monitor device 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory.

Figure 2:
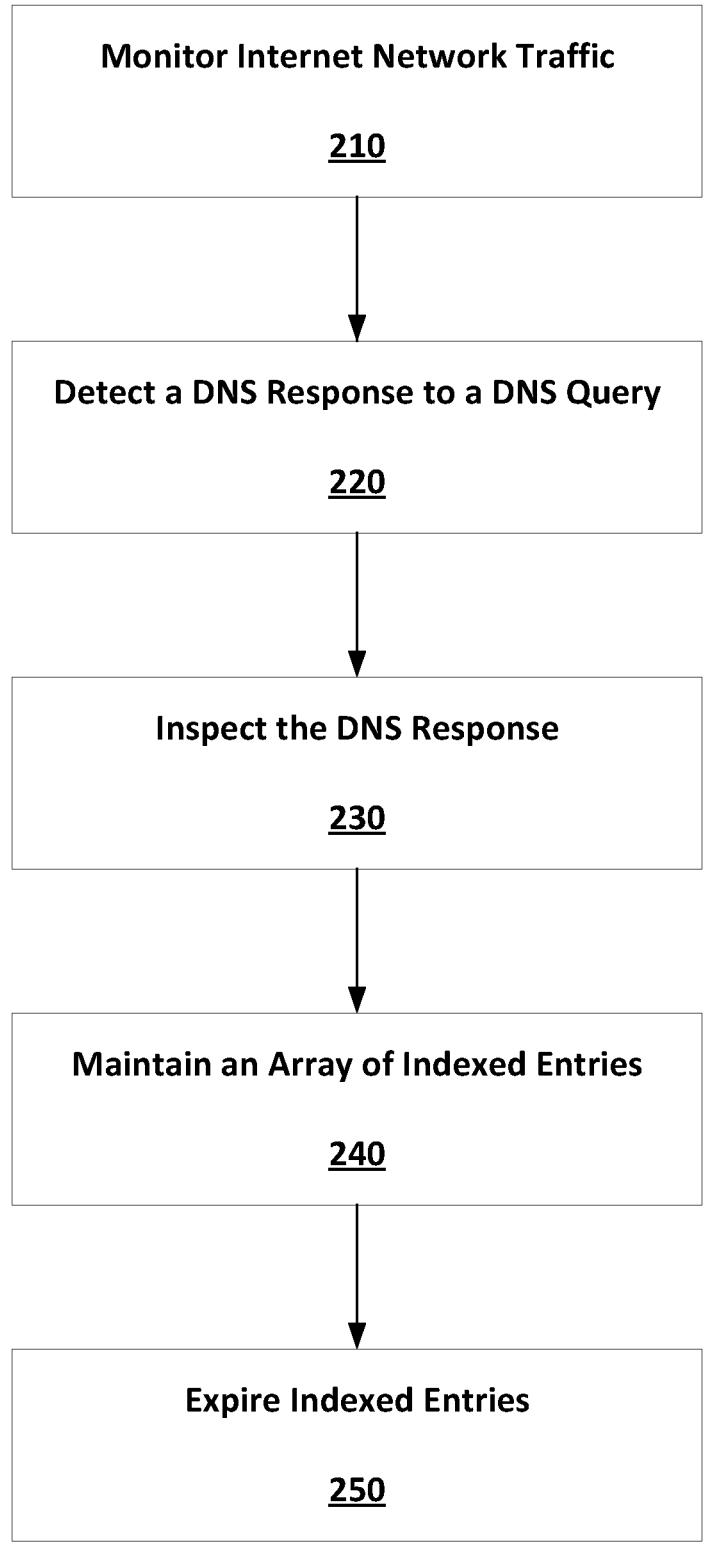
FIG. 2 is a flowchart of operational steps performed in accordance with an illustrative embodiment of the present invention.

With reference now to FIG. 2 (and with continuing reference to FIG. 1) shown is flowchart depicting certain operational steps performed by the monitor device 150 in accordance with illustrative embodiments for matching an internet service with an IP host address to attribute network traffic to the internet service (SERVICE_NAME) by mapping one or more server names to an internet service by the network monitor device 150. Before turning to the descriptions of FIG. 2, it is noted that the flow diagram shown therein is described, by way of example, with reference to components shown in FIG. 1, although these operational steps may be carried out in any system and are not limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting at step 210, the traffic flow 151 of internet network traffic from the communication network 102 (e.g., the Internet) to the network of consumer devices 100 is received for monitoring by the monitor device 150. Next, at step 220, the monitor device 150 is configured and operable to detect in the monitored Internet traffic a DNS Response sent from one or more external DNS Server 104 in response to a DNS Query sent from a service consumer device 160a-160d regarding an Internet service (e.g., Netflix) provided by one or more servers 106a-106n. Next, at step 230, the detected DNS Response is inspected to determine an association of a service consumer's IP address with an internet service's server IP address in the detected DNS Response relating to a certain internet service. In accordance with the illustrated embodiments, a DNS Response is preferably passively examined by the monitor device 150 such that at least the following components are extracted from the DNS Response: 1) IP Address of the DNS Querier (QUERIER_ADDR); 2) DNS Name for which the address was requested (SERVER_NAME); 3) one or more IP Addresses corresponding to the DNS Name (SERVER_ADDR); and 4) amount of time remaining during which the SERVICE_NAME corresponds to SERVER_ADDR (the Time-to-Live (TTL) value) for each of the one or more IP Addresses. And in the event there are multiple servers associated with provision of the certain internet service, then one or more SERVER_NAMES are mapped, preferably by way of user configuration, to a single SERVICE_NAME.

It is to be appreciated that preferably in monitor device 150 (or in device/component association therewith), maintained in an array of indexed entries (SERVICE_TABLE) is an association of the service consumer's IP address with an internet service's server IP address relating to a certain internet service for a certain length of time using a probabilistic data structure for the indexed entries, step 240. In accordance with the illustrated embodiments, each probabilistic data structure is preferably a Time-Decaying Bloom filter for a certain internet service as represented by a unique index and it is to be appreciated that each of the array of entries is a Time-Decaying Bloom filter specific to a certain internet service, such that for each SERVICE_NAME a Time-Decaying Bloom filter (F) is allocated by the monitoring device 150 whereby a clock (CLOCK) ticks with a certain user-configured period (PERIOD) (e.g. 60 seconds). It is also to be appreciated that each Time-Decaying Bloom filter is an array of non-negative integers and is indexed by the result of a hash function computed over the pairs formed from the querier IP address and each service IP address from the DNS response, wherein non-zero values in all array elements are decremented by PERIOD with every tick of CLOCK.

It is to be further appreciated that the certain length of time is extended upon a continuing association of the service consumer's IP address with the internet service's server IP address in the monitored internet traffic relating to a certain internet service. In accordance with illustrated embodiments, the certain length of time (R_TTL) is obtained by a rounding up the Time-to-Live (TTL) value in the detected DNS Response to the nearest multiple of PERIOD. In accordance with the illustrated embodiments, the Time-Decaying Bloom filter is updated upon receiving a (QUERIER_ADDR, SERVER_NAME, SERVER_ADDR, TTL) tuple, and based on a user configuration including the steps of:

1) map the SERVER_NAME to a SERVICE_NAME;
2) look up the Time-Coded Bloom filter, F, corresponding to SERVICE_NAME in the SERVICE_TABLE;
3) using M different hash functions, generate M hash values for the pair (QUERIER_ADDR, SERVER_ADDR) and denote these as H1, . . . , HM;
4) compute a filter array index for each hash value and denote these array indices as I1, . . . , IM;
5) round each TTL value up to the next multiple of PERIOD to obtain R_TTL; and
6) for each array index i in {I1, . . . , IM}: F[i]:=MAX (F[i], R_TTL).

At step 250, the association of the service consumer's IP address with an internet service's server IP address relating to a certain internet service is expired upon expiration of the certain length of time. In accordance with the illustrated embodiments, the expiration of entries from a Time-Coded Bloom filter is caused by clock which ticks every PERIOD time units, such that upon every clock tick, the following loop of pseudo-code is preferably executed by the monitor device 150 for each filter (F): For i ranging from 0 to N−1 inclusive, wherein F[i]:=MAX(0, F[i]−PERIOD). It is then to be understood that to determine if a filter (F), contains a host IP address (HOST_ADDR) paired with an internet service's server IP address, (HOST_ADDR, SERVER_ADDR), relating to the an IP service, the monitor device 150 performs the following steps:

1) generate M different hash values for the pair and compute filter array indices from them;
2) if F[i] is greater than zero for each array index i in {I1 . . . , IM}, then F contains (HOST_ADDR, SERVER_ADDR); and
3) if not, then F does not contain (HOST_ADDR, SERVER_ADDR).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer implemented method for matching an internet service with an IP host address to attribute network traffic to the internet service by mapping one or more server names to an internet service by a network device, comprising:
monitoring internet network traffic in a communication network by the network device;
detecting a Domain Name System (DNS) Response to a DNS Query in the monitored internet network traffic;
inspecting the DNS Response to determine an association of a service consumer's IP address with an internet service's server IP address in the detected DNS Response relating to a certain internet service;
maintaining in an array of indexed entries, an association of the service consumer's IP address with an internet service's server IP address relating to a certain internet service for a certain length of time using a probabilistic data structure for the indexed entries;
extending the certain length of time upon continuing association of the service consumer's IP address with the internet service's server IP address in the monitored internet traffic relating to the certain internet service; and
expire the association of the service consumer's IP address with an internet service's server IP address relating to a certain internet service upon expiration of the certain length of time.

2. The method as recited in claim 1, wherein each probabilistic data structure is a Time-Decaying Bloom filter for a certain internet service as represented by a unique index, wherein each of the array of entries is a Time-Decaying Bloom filter specific to a certain internet service.

3. The method as recited in claim 2, wherein for each internet service a Time-Decaying Bloom filter (F) is allocated by the network device.

4. The method as recited in claim 1, wherein a clock ticks with a certain user-configured time period.

5. The method as recited in claim 4, wherein the certain length of time is obtained by a rounding up the Time-to-Live value in the detected DNS Response to the nearest multiple of the user configured time period.

6. The method as recited in claim 2, wherein each Time-Decaying Bloom filter is an array of non-negative integers and is indexed by the result of a hash function computed over the pairs formed from the querier IP address and each service IP address from the DNS response.

7. The method as recited in claim 6, wherein the non-zero values in all array elements decrement by the user configured time period with every tick of the clock.

8. The method as recited in claim 6, wherein the value stored in each array element is the amount of time until the value decays to zero.

9. The method as recited in claim 1, wherein a DNS Response is passively examined by the network device that monitors the internet network traffic such that at least the following components are extracted from the DNS Response: 1) IP Address of the DNS Querier; 2) DNS Name for which the address was requested; 3) one or more IP Addresses corresponding to the DNS Name; and 4) amount of time remaining during which the DNS name corresponds to the IP address of the DNS name for each of the one or more IP Addresses.

10. The method as recited in claim 9, wherein one or more DNS names are mapped by way of user configuration to a single DNS name.

11. The method as recited in claim 10, wherein the Time-Decaying Bloom filter is updated upon receiving a tuple, and based on the user configuration, the following steps are performed: 1) map the IP address corresponding to the DNS name to a internet service; 2) look up the Time-Coded Bloom filter (F) corresponding to internet service in the indexed entries; 3) using M different hash functions, generate M hash values for the pair and denote these as $H_1, \ldots H_M$; 4) compute a filter array index for each hash value and denote these array indices as $I_1, \ldots I_M$; 5) round each TTL value up to the next multiple of PERIOD to obtain R_TTL; and 6) for each array index i in $\{I_1 \ldots I_M\}$:F[i]:= MAX(F[i], R_TTL).

12. The method as recited in claim 11, wherein the expiration of entries from the Time-Coded Bloom filter is caused by the clock which ticks in accordance with the user configured time period.

13. The method as recited in claim 12, wherein upon every clock tick, the following loop of pseudo-code is executed by the network device for each filter (F): For i ranging from 0 to N-1 inclusive, wherein F[i]:=MAX(0, F[i]—the user configured time period).

14. The method as recited in claim 13, wherein to determine if a filter (F), contains a host IP address paired with an internet service's server IP address, relating the an IP service, the network device performs the following steps: 1) generate M different hash values for the pair and compute filter array indices from them; 2) if F[i] is greater than zero for each array index i in $\{I_1, I_M\}$, then F contains the Internet service's server IP address; and 3) if not, then F does not contain the Internet service's server IP address.

15. A computer system for matching an internet service with an IP host address to attribute network traffic to the internet service by mapping one or more server names to an internet service by a network device, comprising:
a memory configured to store instructions;
a processor disposed in communication with said memory, wherein said processor upon execution of the instructions is configured to:
intercept network packets to monitor internet network traffic in a communication network;
detect a Domain Name System (DNS) Response to a DNS Query in the monitored internet network traffic;
inspect the DNS Response to determine an association of a service consumer's IP address with an internet service's server IP address in the detected DNS Response relating to a certain internet service;
maintain in an array of indexed entries, an association of the service consumer's IP address with an internet service's server IP address relating to a certain internet service for a certain length of time using a probabilistic data structure for the indexed entries;
extend the certain length of time upon continuing association of the service consumer's IP address with the internet service's server IP address in the monitored internet traffic relating to the certain internet service; and
expire the association of the service consumer's IP address with an internet service's server IP address relating to a certain internet service upon expiration of the certain length of time.

16. The computer system as recited in claim 15, wherein each probabilistic data structure is a Time-Decaying Bloom filter for a certain internet service as represented by a unique index, wherein each of the array of entries is a Time-Decaying Bloom filter specific to a certain internet service.

17. The computer system as recited in claim 15, wherein for each Internet service a Time-Decaying Bloom filter (F) is allocated by the network device.

18. The computer system as recited in claim 15 wherein a clock ticks with a certain user-configured time period.

19. The computer system as recited in claim 18, wherein the certain length of time is obtained by a rounding up the Time-to-Live value in the detected DNS Response to the nearest multiple of the user configured time period.

20. The computer system as recited in claim 17, wherein: each Time-Decaying Bloom filter is an array of non-negative integers and is indexed by the result of a hash function computed over the pairs formed from the querier IP address and each service IP address from the DNS response; the non-zero values in all array elements decrement by the user configured time period with every tick of the clock; the value stored in each array element is the amount of time until the value decays to zero; and wherein a DNS Response is passively examined by the network device that monitors the interne network traffic such that at least the following components are extracted from the DNS Response: 1) IP Address of the DNS Querier; 2) DNS Name for which the address was requested; 3) one or more IP Addresses corresponding to the DNS Name; and 4) amount of time remaining during which the DNS name corresponds to the IP address of the DNS name for each of the one or more IP Addresses.

\* \* \* \* \*